United States Patent Office 3,488,171
Patented Jan. 6, 1970

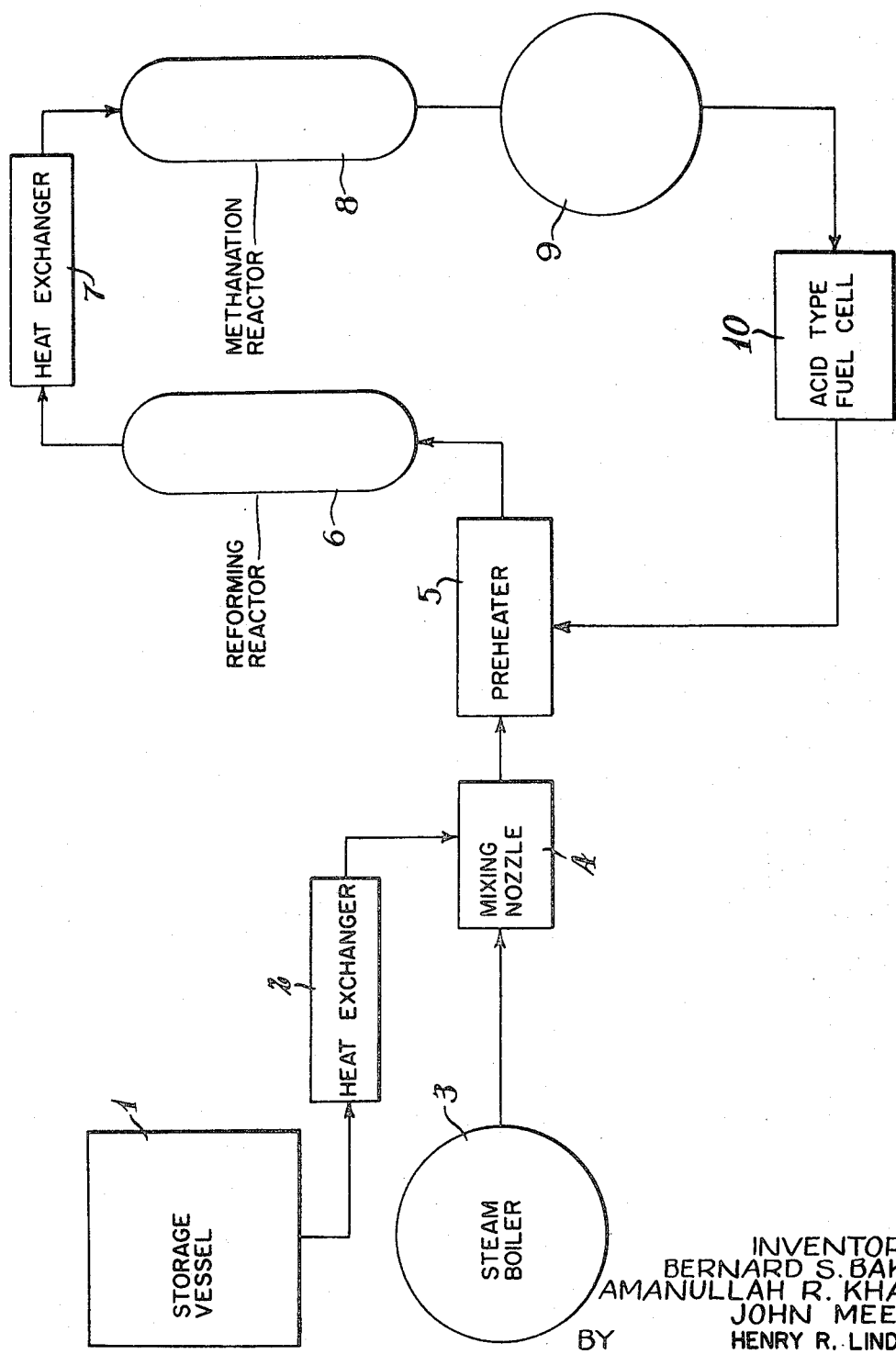

3,488,171
REFORMING AND SELECTIVE METHANATION OF HYDROCARBONS TO GENERATE HYDROGEN
Bernard S. Baker, Chicago, John Meek, Deerfield, Amanullah R. Khan, Chicago, and Henry R. Linden, Hinsdale, Ill., assignors to Institute of Gas Technology, Chicago, Ill.
Filed June 4, 1965, Ser. No. 461,298
Int. Cl. C10k 3/02
U.S. Cl. 48—197
9 Claims

ABSTRACT OF THE DISCLOSURE

A two-stage process whereby hydrocarbons having an end boiling point up to 500° F. are converted by steam reforming in the presence of a nickel-alumina-aluminum catalyst to hydrogen-rich gas, which is then selectively methanated to convert carbon monoxide to methane thus rendering the gas suitable for use as fuel for an acid-type fuel cell.

---

This invention relates to an improved process for the conversion of hydrocarbons into hydrogen-rich gases which can then be utilized in a fuel cell of the acid electrolyte type for the production of electrical energy. In particular, the invention relates to a two-stage process whereby hydrocarbons having an end boiling point up to 500° F. are converted by steam reforming to hydrogen-rich gas, which gas is then methanated to remove carbon monoxide to be rendered suitable for use as fuel for an acid-type fuel cell.

Considerable interest during the past few years has been focused on the electro-chemical conversion of a chemical fuel and oxidant in a fuel cell to produce electricity. Because of its noiseless and efficient operation, the fuel cell is a very desirable device for production of electricity. Until, the present time, most of the development work which has been accomplished has been with fuel cells using pure hydrogen as fuel and oxygen or air as the oxidant. Hydrogen is a very desirable electrochemical fuel since it is highly reactive. Nevertheless, it has two major drawbacks; high cost and difficulty in storage.

The ideal fuel cell would be one which could consume hydrocarbons directly for the production of electrical energy. However, although such processes are technically possible, they are not economically practical because of the high cost of the fuel cell catalysts needed to achieve this type of oxidation.

One process for the production of hydrogen-rich gases from hydrocarbons for fuel cells utilizes catalytic steam reforming and has as its goal the production of pure hydrogen via palladium diffusion. This process is undesirable because it requires expensive high temperature and high pressure equipment and further requires use of expensive diffusion equipment.

There have also been proposed processes for using hydrogen-rich gases containing carbon monoxide, carbon dioxide, and methane directly as fuels for acid type fuel cells, without removing the harmful non-hydrogen constituents. However, such processes have proved impractical and inefficient since the cells become polarized because of the presence of carbon monoxide and inoperable within a short time.

Prior art in catalytic steam reforming of hydrocarbon feeds having an end boiling point up to 500° F. has required the use of high temperatures, above 1100° F., and high steam to hydrocarbon ratios, typically more than 4.5 pounds per pound of hydrocarbon. In order to avoid carbon depositon and subsequent plugging of catalyst beds, especially at superatmospheric pressures and in the presence of non-paraffinic hydrocarbons, the steam to hydrocarbon ratios has to be substantially higher. Examples of such minimum steam to hydrocarbon ratio at typical operating temperature of 1100° F. to 1850° F. and pressures up to 350 p.s.i.g. are described in U.S. Patent No. 3,106,457. Where low temperature steam reforming of liquid hydrocarbon has been practiced for the purpose of making methane at temperature below 1100° F., as described in British patent No. 820,257, the compositon of the gas produced contains a relatively low amount of hydrogen. Also, in such processes the presence of olefins and aromatics in the feed is deleterious and harmful to catalyst activity and therefore such processes require a pretreated feed. It is therefore desirable to provide a process for the production of hydrogen by the catalytic steam reforming of hydrocarbons free from the above limitations.

It is thus an object of this invention to produce continuously from all types of hydrocarbons having an end boiling point up to 500° F., hydrogen-rich gases which after removal of carbon monoxide are suitable for use in low temperature acid fuel cells.

It is another object of this invention to produce continuously from such hydrocarbons hydrogen-rich gases suitable for use in low temperature acid fuel cells via a two-stage process wherein, due to lower temperatures of operation than conventionally used, the first stage produces a gas high in hydrogen content and sufficiently low in carbon monoxide that carbon monoxide may be substantially eliminated by methanation without requiring the carbon monoxide shift reaction.

It is a further object of this invention to produce continuously from such hydrocarbons hydrogen-rich gases suitable for use in low temperature acid fuel cells via a two-stage process, which process eliminates the requirement for hydrogen purification prior to use in such fuel cells.

Still another object of the invention is to produce continuously from such hydrocarbons hydrogen-rich gases suitable for use in low temperature acid fuel cells by a process in which heat requirements for the process are met by the spent gas from the fuel cell.

It is another object of this invention to produce continuously from hydrocarbons having an end boiling point up to 500° F., hydrogen-rich gas suitable for use in low temperature acid fuel cells, wherein the hydrocarbons may contain olefins and aromatics.

A further object of this invention is to produce continuously from such hydrocarbons hydrogen-rich gases suitable for use in low temperature acid fuel cells wherein the process occurs at temperatures significantly lower than conventional practice so that the gas generator can be brought to operating conditions from ambient temperature more rapidly and less expensive materials of construction may be used.

Another object of this invention is to produce continuously from such hydrocarbons hydrogen-rich gases for use in low temperature acid fuel cells by a process which can operate at significantly lower pressures than are normally required for hydrogen generation processes for fuel cells by the usual process in which hydrogen is purified by passage through a palladium diffuser which operates at elevated pressures. In our process, the lower operating pressure increases the hydrogen yield and reduces the weight of the process equipment.

Another object of this invention is to produce from hydrocarbons a hydrogen-rich gas whereby the gas so produced is at a lower temperature than is conventional for steam reforming processes and where the steam-to-hydrocarbon feed ratio is also lower than in such processes, and therefore the process is more efficient for use in low temperature acid fuel cells.

Other objects will become apparent as the invention is more fully described hereinafter.

When hydrocarbons such as petroleum distillates are reformed with steam over a highly active catalyst the following reaction occurs:

$$C_nH_{2n+2} + H_2O \longrightarrow CH_4 + CO + CO_2 + H_2 \qquad (1)$$

The precise composition of the resulting gas is determined by the reaction conditions and by the following reactions both of which tend to approach equilibrium at the preferred reaction conditions:

$$CO + 3H_2 \rightleftharpoons CH_4 + H_2O \qquad (2)$$

$$CO + H_2O \rightleftharpoons CO_2 + H_2 \qquad (3)$$

In order to achieve the maximum hydrogen production in the process of this invention, the following principles apply: High temperatures, low pressures and high steam-to-hydrocarbon feed weight ratios, increase hydrogen yield. As pressure is decreased, hydrogen yield is increased and methane yield is decreased. As temperature is increased, hydrogen yield is increased and methane yield decreased. As steam-to-hydrocarbon ratio is increased, the hydrogen yield increases and, at any given temperature and pressure approaches a limiting ratio beyond which further increase in steam results in negligible increases in hydrogen yield and decreases in methane yield. The yield of carbon dioxide increases with an increase in steam-to-hydrocarbon feed weight ratio and increases with a decrease in temperature, but varies only slightly with changes in pressure. In addition the molecular weight and composition of the feedstock will dictate optimum conditions of temperature and pressure and steam-to-hydrocarbon feed weight ratios.

In selecting steam-to-hydrocarbon feed weight ratios for this process, we have found the following to be true: As the aromatic and olefin contents and the molecular weight of the feed increase, and as the temperature increases, more steam is required. The minimum steam-to-hydrocarbon weight ratio required to prevent carbon deposition will depend upon the molecular weight and composition of the feedstock for any given set of reactor operating conditions.

The objects of our invention are achieved by first reacting with steam hydrocarbons having an end boiling point up to 500° F. and are vaporous at the operating conditions of the reactor in the presence of a nickel-alumina-aluminum catalyst at pressure ranging from 1 to 10 atmospheres, preferably 1 to 5 atmospheres, and at temperatures ranging from about 700° F. to 1100° F. Typical hydrocarbon feedstocks useful in this invention are liquified petroleum gases, petroleum napthas, natural gasoline, kerosene, JP-4 and similar petroleum distillates. The steam-to-hydrocarbon weight ratio of feed material is to be maintained above the minimum required to prevent carbon deposition for the particular feedstock at the desired operating conditions.

To achieve a close approach to equilibrium within the temperature range of 700° F. to 1100° F., a highly active catalyst is required. We have found that it is essential in the practice of this invention to use a novel nickel-alumina-aluminum catalyst containing from 25 to 80% by weight nickel, 10 to 60% by weight alumina and the balance aluminum.

As a typical example, the catalyst used in this invention is prepared as follows: An alloy composed of approximately 42 weight percent nickel and 58 weight percent aluminum is crushed into particles of one-half inch diameter or less, and treated with twice its weight of a 0.5 N sodium hydroxide solution in water. When this nickel-aluminum alloy is treated with sodium hydroxide solution a reaction occurs resulting in evolution of hydrogen and formation of sodium aluminate and alumina. Hydrogen is allowed to evolve until the desired conversion of aluminum is obtained, preferably 30 to 85%. During this reaction, the temperature of the mixture is maintained at its boiling point by external heating. After the desired conversion is obtained, the reaction is quenched with water. The catalyst is then repeatedly washed with tap water equal each time in weight to the weight of the original alloy for a minimum of 15 washings. After this procedure is accomplished, the catalyst is subjected to four equivalent washings with methanol and then stored in methanol for use in the process. Alternatively the catalyst may be stored in ethanol, dioxane or other suitable media. Typical compositions of the catalyst prepared by the above procedure are as follows:

| Catalyst Batch No. | Composition, Wt. percent | | |
| --- | --- | --- | --- |
| | 1 | 2 | 3 |
| Aluminum | 18.5 | 20.3 | 22.0 |
| Nickel | 44.3 | 42.4 | 55.4 |
| $Al_2O_3 \cdot 3H_2O$ | 37.2 | 37.3 | 22.6 |
| | 100.0 | 100.0 | 100.0 |

We have discovered that the process of the invention will operate satisfactorily with feedstocks containing a relatively high proportion of normal olefins and cyclo-olefins and aromatics such as benzene. In prior processes it has always been necessary to maintain the olefin and aromatics in the feedstock as low as possible.

Another novel and unexpected result of the present invention is the high rate at which the feedstock can be converted as it passes through the reactor.

The second stage of the process of the invention involves reducing the carbon monoxide content of the gas resulting from the first stage by a methanation reaction based on reaction (2) above and employing a highly selective catalyst described below. The gas produced by the steam reforming step has unduly high carbon monoxide content for use in an acid fuel cell. The high carbon monoxide content, typically between 5000 and 15,000 p.p.m., is extremely detrimental to the noble metal electrode catalyst used in the cell. We have found that by reducing the carbon monoxide content both the life and power levels of low temperature acid fuel cells are enhanced and practical operation of a cell is possible.

Furthermore we have determined that the effect of carbon monoxide in the fuel cell catalyst is non-accumulative if only low levels of carbon monoxide are present in the feed gas. E.g., we have found that it is possible to operate an acid fuel cell continuously for over 8 months if the concentration of carbon monoxide is maintained at 20 p.p.m. or less whereas operation at carbon monoxide concentration of 1000 p.p.m. can only be sustained for a few hours. If, however, the operating temperature of the fuel cell is raised higher, carbon monoxide concentrations may be tolerated but under these conditions fuel cell construction is more difficult because of corrosion problems associated with hot acids.

We have further found that other gases such as methane and carbon dioxide present in the steam reformed gas exhibit no adverse effects other than expected diluent behavior. The mixture of hydrogen, carbon dioxide, carbon monoxide, methane and unreacted steam is heated in a reaction zone or reactor which is maintained at a temperature below the temperature at which the shift reaction takes place and above the temperature at which the methanation reaction takes place. The temperature is to be below shift reaction temperatures since the reverse shift reaction $(H_2 + CO_2 \rightarrow CO + H_2O)$ is to be avoided because it produces carbon monoxide and consumes hydrogen. It is therefore essential that the methanation catalyst operate at low temperature so the above reaction does not occur. Desirably, the temperature of the methanation reaction is maintained at below 480° F. to avoid the reverse shift and above ambient temperatures to promote the methanation of carbon monoxide. Preferably the methanation reaction is effected between 300° F. and 400° F.

Our reaction is carried out in the presence of a methanation catalyst, preferably a low temperature type, which will assist in the selective methanation of carbon monoxide by hydrogen in order to substantially eliminate the presence of carbon monoxide in the gaseous mixture. By selective methanation is meant that essentially only carbon monoxide and little carbon dioxide reacts with the hydrogen to form methane. Methanation catalysts useful in our process include the noble metal catalysts ruthenium and rhodium. The preferred catalyst is ruthenium on an alumina support of composition 0.5% Ru impregnated in a conventional manner on ⅛ inch alumina pellets. The space velocity of the gaseous mixture through the reaction zone is to be matched to the temperature conditions during the methanation reaction, in order to provide the desired reduction in carbon monoxide. We have found that higher space velocities require higher operating temperatures. Higher space velocities are desirably used since a more efficient use of the catalyst results.

By following our novel procedure, the proportion of carbon monoxide in the gaseous mixture may be reduced, for example, from about 15,000 p.p.m. to about 10 p.p.m.

The above described methanation reaction shows unexpected results in reducing carbon monoxide content. Although reaction (2) is known to take place, the presence of large amounts of carbon dioxide which can react to $$CO_2 + 4H_2 \rightleftharpoons CH_4 + 2H_2O \qquad (4)$$

poses a serious drawback since, if the carbon dioxide reacts, it will consume all of the hydrogen. This difficulty is avoided by operating at the low temperatures indicated above and by employing a catalyst selective to carbon monoxide.

This methanation process hereinabove described is similar to that described in copending application Ser. No. 337,796 filed Jan. 15, 1965, now abandoned, and refiled as a continuation-in-part application Ser. No. 701,036 on Jan. 10, 1968, except that the gas composition fed to the methanation reactor in the instant process contains more carbon monoxide and more methane, making the desired methanation of carbon monoxide even more unexpected. Operating at between 340° F. and 400° F. at space velocities between 200 and 2000 s.c.f. gas/s.c.f. catalyst, it has been found that it is possible to reduce the carbon monoxide content of the effluent gas to as low as 10 p.p.m. The use of this gas in a fuel cell is described in Examples I and II hereinafter in comparison with unprocessed feeds.

For purposes of illustration, an embodiment of the invention is shown in the accompanying drawing which is a schematic flow diagram of the overall process.

In the drawing illustrating the practice of this invention, numeral 1 represents a storage vessel wherein the hydrocarbon feedstock is stored. Preferably the feedstock is paraffinic hydrocarbons but may contain aromatics and olefins. The hydrocarbon feed is pumped through a heat exchanger 2 wherein it is vaporized and then blended with steam from boiler 3 in a mixing nozzle 4. The mixture is maintained at a pressure between 1 to 5 atmospheres depending on the operating conditions, nature of feed and desired product gas. The stream of intimately mixed hydrocarbon vapors and steam is then passed through a preheater 5 wherein it is preheated to initial reaction temperature ranging from 700° F. to 1100° F. depending on the operating conditions, nature of feed and desired product gas. The mixture of hydrocarbon vapors and steam then pass into the reactor 6 through a bed of catalyst. The gasification reactions occur here and the hydrocarbons are essentially completely gasified. The resulting effluent which is primarily a mixture of hydrogen, methane, carbon monoxide, carbon dioxide, and unreacted steam exits from the reforming reactor, is cooled in heat exchanger 7 and fed to the methanation reactor 8. If desired, waste heat from the reformer effluent can be gainfully employed in either heat exchanger 2 or steam boiler 3.

The effluent from the methanation reactor 8 is cooled in heat exchanger 9 wherein the excess steam is condensed and removed and the gas fed directly to the acid fuel cell 10. Waste heat from the methanation reactor effluent may also be gainfully employed in heat exchanger 2 or steam boiler 3. The spent gas from the fuel cell is burned to provide heat for preheat zone 5 and may be further utilized for preheating the hydrocarbon or the generation of steam or any other process heat whatsoever.

The invention will be further described by means of the following examples, it being understood that the examples are given for purposes of illustration only and are not to be construed in any way as restricting the invention beyond the scope of the appended claims.

Example I

An apparatus embodying the system shown in the drawing was employed in the gasification of a natural gasoline for production of hydrogen-rich gas.

The properties of said feedstock were as follows:

| | |
|---|---:|
| Specific gravity _____ ° API__ | 76.1 |
| ASTM distillation range _____ ° F__ | 88–338 |
| Reid vapor pressure _____ p.s.i.g.__ | 13.63 |
| Sulphur _____ wt. percent__ | 0.0146 |

| Composition: | Volume percent |
|---|---:|
| Paraffins _____ | 86.0 |
| Naphthenes _____ | 11.3 |
| Aromatics _____ | 2.7 |
| Total _____ | 100.0 |

No carbon deposition on the catalyst or liquid hydrocarbon breakthrough occurred and run conditions were as follows:

| | |
|---|---|
| Catalyst composition (weight percent) _____ | Al, 21.5; Ni, 42.3; $Al_2O_3 \cdot 3H_2O$, 36.2. |
| Catalyst volume _____ | 25 cc. |
| Reactor pressure _____ | 14.7 p.s.i.g. |
| Temperature at center of bed _____ | 1060° F. |
| Steam-to-gasoline weight ratio _____ | 2.93. |
| Gasoline space velocity ____ | 297 lb./hr.-cu. ft. catalyst. |

| Product gas composition (water-free): | Mole percent |
|---|---:|
| $CO_2$ _____ | 22.0 |
| $H_2$ _____ | 51.4 |
| $CH_4$ _____ | 25.1 |
| CO _____ | 1.5 |
| Total _____ | 100.0 |

The product gas from the above was then fed directly into the methanation unit. The following conditions prevailed:

| | |
|---|---|
| Catalyst (ruthenium-on-alumina) _____ | 48 cc. |
| Reactor pressure _____ | 14.7 p.s.i.g. |
| Bed temperature _____ | 356° F. |
| Space velocity _____ | 250 cu. ft. gas/cu. ft. cat.-hr. |

Product gas composition (water-free):
- $CO_2$ _____ mole percent__ 23.0
- $H_2$ _____ do____ 48.0
- $CH_4$ _____ do____ 29.0
- $CO$ _____ p.p.m__ 8

The following table shows a comparison of fuel cell operations using pure hydrogen, a hydrogen-rich gas of Example I before removing carbon monoxide and a hydrogen-rich gas of the example after removing carbon monoxide. There was employed a low temperature acid cell using sulfuric acid operating at 14.7 p.s.i.g. and 150° F.

| Fuel cell feed, mole percent | Anode polarization resistance free (mv.) | Equivalent fuel-air potential at 40 ma./cm.² (mv.) | Power at 40 ma./cm.² (mw./cm.²) |
|---|---|---|---|
| $H_2$, 100 | 60 | 840 | 33.6 |
| $H_2$, 51.4; $CH_4$, 25.1; $CO$, 1.5; $CO_2$, 22.0 (after first process step) | 370 | 530 | 21.2 |
| $H_2$, 48; $CH_4$, 29; $CO_2$, 23; $CO$ 8 p.p.m. (after second process step) | 90 | 810 | 32.4 |

It is clear from the above table that over 50% higher power densities can be achieved when the gas is subjected to the two-step process hereinabove described. Moreover, it is apparent that the dilution effects resulting from the presence of methane and carbon dioxide cause less than a 4% drop in power output when compared with the performance of pure hydrogen.

Example II

An apparatus embodying the system shown in the drawing was employed in the gasification of a jet fuel (JP-4) for production of hydrogen-rich gas.

The properties of said feedstock were as follows:

Gravity _____ ° API__ 56.5
ASTM distillation range _____ ° F__ 194-478
Sulphur _____ wt. percent__ 0.0042

Composition:                        Volume percent
- Saturates _____ 84.8
- Olefins _____ 4.6
- Aromatics _____ 10.6

No carbon decomposition on the catalyst (same as Example I) or hydrocarbon breakthrough occurred and run conditions were as follows:

Catalyst volume _____ 25 cc.
Reactor pressure _____ 14.7 p.s.i.g.
Bed temperature _____ 968° F.
Steam-to-jet fuel (weight ratio) _____ 5.16.
Jet fuel space velocity ____ 183 lb./hr.-cu. ft. catalyst.

Product gas composition (water-free):    Mole percent
- $CO_2$ _____ 22.7
- $H_2$ _____ 57.1
- $CH_4$ _____ 18.9
- $CO$ _____ 1.3

Total _____ 100.0

The product gas from the above was then fed directly into the methanation unit. The following conditions prevailed:

Catalyst (ruthenium-on-alumina) volume _____ 48 cc.
Reactor pressure _____ 14.7 p.s.i.g.
Bed temperature _____ 378° F.
Space velocity _____ 330 cu. ft. gas/cu. ft. cat.-hr.

Product gas composition (water-free):
- $CO_2$ _____ mole percent__ 23.6
- $H_2$ _____ do____ 55.4
- $CH_4$ _____ do____ 21.0
- $CO$ _____ p.p.m__ 18

The following table shows a comparison of fuel cell operations using pure hydrogen, a hydrogen-rich gas of Example II before removing carbon monoxide and a hydrogen-rich gas of the example after removing carbon monoxide. There was employed a low temperature acid cell using sulfuric acid operating at 14.7 p.s.i.g. and 150° F.

| Fuel cell feed, mole percent | Anode polarization resistance free (mv.) | Equivalent fuel-air potential at 40 ma./cm.² (mv.) | Power at 40 ma./cm.² (mw./cm.²) |
|---|---|---|---|
| $H_2$, 100 | 70 | 830 | 33. |
| $H_2$, 57.1; $CH_4$, 18.9; $CO$, 1.3; $CO_2$, 22.7 (after first process step) | 240 | 660 | 26.4 |
| $H_2$, 55.4; $CH_4$, 21.0; $CO_2$, 23.6; $CO$, 18 p.p.m. (after second process step) | 80 | 810 | 32.4 |

It is clear from the above table that 25% higher power densities can be achieved when the gas is subject to the two-step process hereinabove described. Moreover, it is apparent that the dilution effects resulting from the presence of methane and carbon dioxide cause less than a 3% drop in power output when compared with the performance with pure hydrogen.

From the above examples, it is apparent that the process produces high hydrogen content gas continuously from hydrocarbons containing olefins and aromatics and with end boiling points as high as 500° F. when reacted with steam in the presence of the novel nickel-alumina-aluminum catalyst. It is further apparent that these gases are successfully treated to selectively methanate carbon monoxide in the presence of a large amount of carbon dioxide and methane and fed directly to an acid fuel cell to generate electricity.

We claim:

1. Process for making hydrogen-rich gas suitable for use with an acid type fuel cell from liquid and gaseous hydrocarbon feeds having an end boiling point up to 500° F., which process comprises reacting vaporized feedstock with steam in the presence of a catalyst consisting essentially of nickel-alumina-aluminum at a pressure between 1 to 5 atmospheres and a temperature between 700° F. to 1100° F. to produce a gas rich in hydrogen and passing said gas through a methanation reactor in the presence of a selective methanation catalyst at a temperature below 480° F. and above ambient temperature to effect selective conversion of carbon monoxide to methane.

2. The process of claim 1 wherein methanation is effected between 300° F. to 400° F.

3. The process of claim 2 wherein said feedstock and methanation reactions are maintained at substantially 1 atmosphere pressure.

4. The process of claim 3 wherein the steam-to-feedstock weight ratio is less than 3.

5. The process of claim 1 wherein said methanation catalyst is a noble metal selected from the group consisting of ruthenium and rhodium on a catalyst support.

6. The process of claim 5 wherein the methanation catalyst is ruthenium on an alumina support.

7. The process of claim 1 in which said nickel-alumina-aluminum catalyst contains 25 to 80 weight percent nickel, 10 to 60 weight percent alumina and the remainder aluminum.

8. A process as in claim 7 wherein said nickel-alumina-aluminum catalyst contains 44–56 weight percent nickel, 22–38 weight percent alumina, and the remainder aluminum.

9. The process of claim 1 wherein said hydrocarbon feed is a liquid feedstock which contains a substantial proportion of normal olefins, cyclo-olefins, or aromatics.

References Cited

UNITED STATES PATENTS

| | | | |
|---|---|---|---|
| 3,271,325 | 9/1966 | Davies et al. | 252—466 |
| 1,915,473 | 6/1933 | Raney | 252—466 |
| 1,960,886 | 5/1934 | Woodhouse | 23—212 |
| 2,074,311 | 3/1937 | Moore | 23—210 |
| 2,524,840 | 10/1950 | Shapleigh | 23—212 |
| 2,580,068 | 12/1951 | Beekley et al. | 23—212 X |
| 2,750,261 | 6/1956 | Ipatieff et al. | 23—212 |
| 3,141,796 | 7/1964 | Fay et al. | 136—86 |
| 3,156,657 | 11/1964 | Pinder et al. | 252—466 X |
| 3,278,268 | 10/1966 | Pfefferle | 23—212 |

FOREIGN PATENTS

| | | |
|---|---|---|
| 468,059 | 9/1950 | Canada. |
| 557,778 | 5/1958 | Canada. |

ALLEN B. CURTIS, Primary Examiner

U.S. Cl. X.R.

23—212; 136—86; 252—373